UNITED STATES PATENT OFFICE.

BALTHASAR KREISCHER, OF NEW YORK, N. Y.

IMPROVEMENT IN COMPOSITION TILES FOR FIREPROOFING BUILDINGS.

Specification forming part of Letters Patent No. 112,929, dated March 21, 1871.

*To all whom it may concern:*

Be it known that I, BALTHASAR KREISCHER, of the city, county, and State of New York, have invented a new and Improved Compound for Tiles; and I do hereby declare the following to be a full, clear, and exact description thereof, which will enable those skilled in the art to make and use the same.

This invention relates to a compound for tiles which are to be used particularly for the inner walls of fire-proof buildings, the principal object of the compound being to produce a tile which is light, porous, and a bad conductor of heat.

My compound consists of hydraulic cement, calcined fire-clay, and coal-ashes, and these ingredients are mixed together in about the following proportions: Hydraulic cement, one part; calcined fire-clay, three parts; coke, one part; but these proportions may be changed, according to the quality of the ingredients and the nature of the work to be produced. Said ingredients are powdered and mixed together in a dry state; and in order to form tiles of the desired form my compound is mixed with a sufficient quantity of water to produce a plastic mass, which is introduced in suitable molds. After the tiles have been formed they are allowed to dry, and they are ready for use in a short time. No artificial heat is required for drying them.

The hydraulic cement mixed with the compound causes the various ingredients to adhere firmly together, and by the calcined fire-clay and coke the tiles are rendered porous and light, and capable of withstanding a very high temperature, the powdered coke assisting in forming a firm connection between the cement and fire-clay, and to impart a certain elasticity to the tiles, which effect is produced particularly by the small quantity of tar still retained in the pores of the coke. At the same time a tile made from my compound is a good non-conductor of heat. It can be heated to a high temperature at one end and yet held in the hand at the other end, and on account of these qualities my tiles are particularly fit for the inner walls and ceilings of fire-proof buildings. Furthermore, my compound can be molded in a variety of ornaments; and cornices, center-pieces, or ornamental devices for ceilings and walls can be made therefrom with ease and facility. They are, however, not intended for outside walls, since they absorb moisture, and would be liable to produce dampness in a building when exposed to rain.

What I claim as new, and desire to secure by Letters Patent, is—

A compound for tiles made of the ingredients herein specified, and mixed together in about the proportions above set forth.

BALTHASAR KREISCHER.

Witnesses:
 W. HAUFF,
 E. F. KASTENHUBER.